United States Patent [19]
Hooper

[11] 4,066,142
[45] Jan. 3, 1978

[54] LOOP DRIVEN VEHICLES

[76] Inventor: Bernard Hooper, Maybank House, Hope Street, Wardsley, Stourbridge, West Midlands, England

[21] Appl. No.: 712,199

[22] Filed: Aug. 6, 1976

[30] Foreign Application Priority Data

Aug. 11, 1975 United Kingdom ............... 33330/75

[51] Int. Cl.² ............................................. B62M 7/04
[52] U.S. Cl. .................... 180/33 A; 180/32; 280/281 R
[58] Field of Search ............ 180/32, 33 R, 33 A, 180/64 R, 64 L, 64 M, 72, 33 B, 29, 30; 280/281 R, 284

[56] References Cited

U.S. PATENT DOCUMENTS

| 2,950,625 | 8/1960 | Jaulmes | 180/33 R X |
| 3,298,713 | 1/1967 | Plain | 280/284 |
| 3,542,146 | 11/1970 | Hooper | 180/64 R X |
| 3,722,612 | 3/1973 | Issigonis et al. | 180/64 R X |
| 3,783,961 | 1/1974 | Hooper | 180/64 R X |
| 3,811,528 | 5/1974 | Hooper | 180/64 R X |
| 4,019,594 | 4/1977 | Koyama | 180/33 A |

FOREIGN PATENT DOCUMENTS

| 1,110,540 | 7/1961 | Germany | 180/32 |
| 907,748 | 7/1949 | Germany | 180/32 |
| 941,111 | 4/1956 | Germany | 180/33 A |
| 450,898 | 8/1949 | Italy | 180/33 A |
| 482,902 | 12/1950 | Italy | 180/32 |
| 504,508 | 12/1954 | Italy | 180/32 |
| 800,488 | 8/1958 | United Kingdom | 180/32 |

*Primary Examiner*—Kenneth H. Betts
*Attorney, Agent, or Firm*—Berman, Aisenberg & Platt

[57] ABSTRACT

A loop driven vehicle such as a motor cycle has a pivoted fork which supports the rear wheel mounted on the engine unit, and the engine unit mounted at its rear on the frame of the vehicle by a mounting which permits angular movement of the engine unit about a second axis parallel to the axis of rotation of the rear wheel, and fore and aft movement of the second axis. This movement of the engine unit is accommodated by one or more second mountings which permit the fore and aft and angular movement and may constrain the engine unit against movement in other directions. The mounting at the rear of the engine unit may comprise a pivoted member, or a flexible plate secured between the engine unit and frame.

4 Claims, 2 Drawing Figures

LOOP DRIVEN VEHICLES

BACKGROUND OF THE INVENTION

1. Field of the Invention

This invention relates to loop driven vehicles including a frame, a power unit mounted on the frame, a wheel driven by a driving loop, e.g. a chain entrained about driving and driven sprockets on the wheel and on the power unit respectively, the wheel being mounted in a pivoted fork whose movement is controlled by resilient suspension means operative between the frame and the fork.

The invention is particularly applicable to motor cycles.

2. Description of Prior Art

It has been proposed hitherto to mount the power unit of a motor cycle relatively to the frame by resilient mountings in order to isolate, as far as possible, the rider from vibration arising from operation of the power unit. Vibration transmitted to the frame and thus to the rider of a motor cycle can become extremely disturbing to the rider over a period of time. Despite an increasing tendency nowadays to install multi-cylinder power units in motor cycles, which power units can be designed to give little vibration when operating, single and twin cylinder engines are still widely employed, particularly in smaller machines, and as these engines inherently tend to give rise to relatively large levels of vibration when operating there is a requirement for mounting such power units in a manner providing for damping of vibrations transmitted from the power unit to the frame.

In U.S. Pat. Nos. 3,542,146 and 3,783,961 there are described motor cycles in which the pivoted fork which supports the rear wheel is pivotally mounted on the power unit, and the power unit is resiliently mounted to the frame by mountings each of which permits much greater relative movement between the power unit and frame in directions parallel to a plane perpendicular to the axis of rotation of the driving wheel than in directions parallel to said axis. By this means, accurate alignment between the driving and driven sprocket on the power unit and wheel is maintained, to ensure satisfactory operating conditions for the driving chain. If such alignment is not maintained, the chain may become disengaged from one or both sprockets. Vibration damping is obtained by virtue of the permitted movement of the power unit parallel to the plane perpendicular to the driving wheel axis, and the restriction of movement of the power unit in directions parallel to said axis ensures that the driving wheel is maintained in the correct alignment with the frame. Retention of this alignment is essential in order that a motor cycle retains satisfactory handling qualities.

It has been found in practice, however, that the systems described in these two U.S. patent specifications require considerable maintenance attention if the machine is to maintain satisfactory handling qualities. This is because the mountings incorporate cooperating faces which determine permissible movement of the power unit in directions parallel to the driving wheel axis, which faces are subject to wear with the result that the required alignment between the driving wheel and frame may not be satisfactorily maintained under all conditions if maintenance has been neglected.

A further system has been proposed in U.S. Pat. No. 3,722,612, which system eliminates the problem of required maintenance to maintain the handling qualities of the motor cycle. In order to ensure vibration damping, however, this system requires that the engine should have unbalanced reciprocating loads, which greatly increases the loading on the main bearings of the engine. Although this relatively increased main bearing loading can be acceptable in certain two stroke cycle engines, it is in general unacceptable for four stroke cycle engines.

SUMMARY OF THE INVENTION

It is the object of the present invention to provide an improved means for mounting the power unit of a vehicle of the kind set forth on the frame which provides for damping of vibration transmitted from the engine to the frame but which overcomes or reduces the disadvantages attached to the systems described above. Thus, the mounting means should not be demanding in terms of maintenance and should be effective with engines of widely varying type and balance factor.

According to the invention, there is provided a loop driven vehicle comprising a frame, a power unit, mounting means movably mounting the power unit on the frame, a fork pivotally mounted on the power unit and a rear wheel mounted in the fork for rotation about a first axis, and a driving loop interconnecting the rear wheel and the power unit, wherein the mounting means comprises first mounting means interposed between the rear of the power unit and the frame for permitting limited angular movement of the power unit about a second axis parallel to the first axis and for permitting movement of the second axis, relative to the frame, in directions generally parallel to the wheel base of the vehicle of an amplitude a number of times greater than the permitted amplitude of movement of the second axis in directions perpendicular to the wheel base and parallel to the first axis, and second mounting means for accommodating said movement of the power unit and providing resilient damping means interposed between the power unit and the frame.

The second axis, i.e. the axis about which the power unit can undergo limited angular movement, is preferably arranged to coincide with, or be closely adjacent to, the instantaneous centre of rotation of the power unit having regard to components of out-of-balance forces which act tangentially to the second axis. It will of course be appreciated that any out-of-balance forces arising from operation of the engine can at any instant be resolved into a component tangential to the second axis and a component acting radially to the second axis, and the effect of the mounting means embodying the invention is that the tangentially acting components cause the power unit to oscillate about the second axis with minimal reaction at this axis. The components acting radially to the second axis cause this second axis to be displaced relative to the frame in a fore-and-aft direction parallel to the wheel base of the vehicle.

According to the extent to which the first mounting means resists angular movement of the second axis, the second mounting means may permit movement of the power unit in directions perpendicular to the first axis of amplitude a number of times greater than it permits movement of the power unit in directions parallel to the first axis. Thus, if the first mounting means provides a high degree of constraint against angular movement of the second axis the second mounting means need not constrain the power unit against movement in directions parallel to the first axis. If however the second mounting means is required to constrain the power unit against such movement, mountings of the kind disclosed in the prior patents above referred to may be utilised for this purpose.

The second axis preferably lies closely adjacent and parallel to the pivot axis of the fork which supports the rear wheel, and conveniently the second axis also forms the pivot axis for the fork.

The first mounting means may comprise a support member in the form of a fork arranged to pivot about an axis rigidly located with respect to the frame and positioned parallel to and above or below the second axis, this member being pivotally connected to the power unit. Alternatively, the first mounting means may comprise a resilient plate member, for example a laminated assembly of spring plates, secured between the power unit and frame. In this latter construction, the second mounting means would be required to provide a relatively high degree of constraint against movement of the power unit in directions parallel to the first axis.

BRIEF DESCRIPTION OF THE DRAWINGS

The invention will now be described, by way of example, with reference to the accompanying drawings, in which.

DESCRIPTION OF PREFERRED EMBODIMENTS

Figures 1, 2:
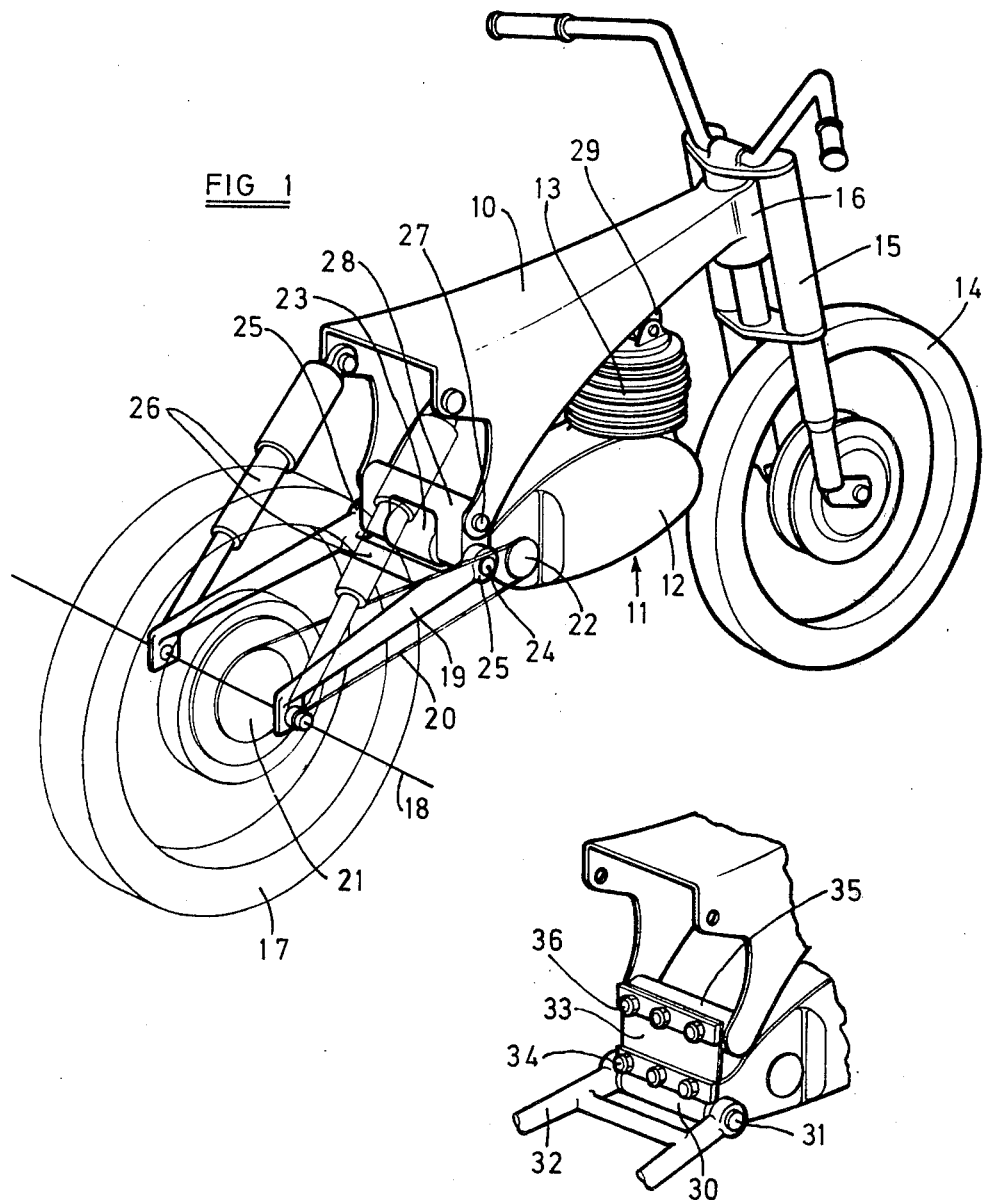
FIG. 1 is a perspective view of a motor cycle incorporating mounting means according to the invention.
FIG. 2 shows an alternative form of mounting means.

Referring firstly to FIG. 1 of the drawings, there is illustrated diagrammatically a motor cycle which includes a frame 10 and a power unit 11, the power unit comprising a crank case and gear case unit 12 and a cylinder block 13. A front wheel 14 is carried in a fork 15 mounted for steering movement about a steering head 16 at the front of the frame, and a rear wheel 17 is mounted for rotation about a first axis 18 at the end of a rear pivoted fork 19. A driving chain 20 is entrained about sprockets 21, 22 on the rear wheel and power unit respectively.

The power unit is provided at its rear with a lug 23 through which extends a shaft 24 at the free ends of which bearing bushes 25 at the inner ends of respective limbs of the fork 19 are received. The fork 19 is thus in effect pivotally mounted on the power unit 11, for movement about the axis of the shaft 24 which provides a second axis parallel to the axis 18 of rotation of the rear wheel. Movement of the fork 19 in this mode is controlled by a pair of suspension units 26 which may be of conventional type incorporating springs and fluid damping systems.

Extending across the frame 10 in the region above the rear of the power unit there is provided a shaft 27 which provides a pivotal mounting for a support member in the form of a relatively short fork 28. The free ends of the downwardly extending limbs of the fork 28 are pivotally mounted on the shaft 24 between the lug 23 and bushes 25.

The effect of this mounting is that the power unit 11 is able to undergo limited pivotal movement about the second axis provided by the shaft 24, which axis is itself free to move in a fore and aft direction, i.e. parallel to the wheel base of the motor cycle. In fact the permitted movement of the axis 24 is arcuate owing to the pivotal mounting of fork 28, but over relatively short displacements such movement approximates to linear movement. It will also be appreciated that because of the nature of the pivotal mounting of the fork 28 the second axis 24 is constrained against angular displacement or displacement in directions perpendicular to the wheel base of the vehicle.

At the top of the cylinder block 13 of the power unit 11, there is provided a second mounting 29 which supports the power unit from the frame 10. This mounting is required to accommodate the movement of the power unit, namely fore and aft movement and pivotal movement, permitted by the mounting at the rear of the power unit, and for this purpose the mounting 29 incorporates members fixed to the power unit and the frame with resilient elements interposed therebetween. In its simplest form the mounting 29 may comprise simply a block of resilient material such as rubber bonded at one side to a part secured to the frame and at the other side to a part secured to the power unit. Alternatively, mountings, such as those disclosed in U.S. Pat. Nos. 3,542,146, (FIG. 4) or 3,722,612 (FIG. 3) may be utilised.

When the power unit of the illustrated motor cycle is in operation any out-of-balance force produced thereby can at any instant be resolved into a component which acts in a generally vertical plane tangentially to the axis 24, and a component which acts in a generally horizontal plane radially to this axis. The effect of the radially acting component is that the engine is caused to oscillate bodily in a generally fore and aft direction, which movement is permitted by the pivotal mounting of fork 28 and accommodated by the resilient second mounting 29. The components acting tangentially to the axis 24 cause the power unit to oscillate angularly about the axis 24, which movement is also accommodated by the second mounting 29. Because of the resilience of the mounting 29 and the damping characteristics thereof, little or no vibration arising from operation of the engine is transmitted to the frame.

It is preferred that the position of the axis 24 about which the power unit can move angularly coincides with the centre of rotation of the power unit with regard to the out-of-balance force components acting tangentially to this axis. If this condition obtains, no appreciable reaction is produced at the axis 24. However, some deviation from this ideal situation is permissible to suit the physical layout of the power unit and frame and rear fork components, whilst still resulting in an acceptable degree of isolation of power unit vibration from the frame.

If the bearings incorporated in the mounting arrangement provided at the rear of the power unit are all such as to provide a high degree of resistance to angular displacement of the axis 24, e.g. if all these bearings comprise simple metal bushes operating on the respective shafts, the second mounting means 29 will not be required to perform any function in maintaining the desired relative alignment between the power unit, rear wheel and frame. Thus in this situation a relatively simple mounting 29 as described above may be employed. However, it would be possible to employ elastic bushes or the like in the mounting arrangement at the rear of the power unit, in which case the second mounting 29 would be required to permit little or no movement of the power unit in directions parallel to the axis of rotation of the rear wheel whilst at the same time permitting movement thereof in directions perpendicular to this first axis. In this case mountings such as those disclosed in prior U.S. Pat. Nos. 3,542,146 and 3,783,961 may conveniently be employed for the second mounting 29. It will be appreciated, however, that maintenance of the required alignment of the power unit is predominantly effected by the first mounting 28.

Although in the embodiment illustrated in FIG. 1 the pivot axis of the rear fork 19 coincides with the axis defined by shaft 24 about which the power unit can move angularly, these axes need not in fact coincide. Thus, it may be more convenient for a particular form of power unit or vehicle to have the rear fork pivot axis defined by a separate bearing arrangement to that which defines the second axis about which the power unit can move angularly.

In the modified form of motor cycle embodying the invention of which part is shown in FIG. 2, the power unit 11 is provided at its rear with a lug 30 in which is received a shaft 31 providing a pivotal mounting for a rear fork 32. The rear of the power unit is mounted in the frame by first mounting means comprising a rectangular resilient plate member 33 which is rigidly secured to the power unit in the region of its lower end by bolts 34 and to a frame member 35 in the region of its upper edge by bolts 36. The plate member 33 is preferably a laminated assembly of individual spring plates secured in face-to-face relation with one another.

The power unit is thus able to undergo fore and aft substantially linear motion, and limited rocking motion about its rear by flexing of the plate member 33. In fact, the same movement of the power unit is permitted as is permitted by the mounting arrangement shown in FIG. 1 and vibration isolation is achieved in the same manner. The plate member 33 can be regarded as providing an axis parallel to the axis of rotation of the rear wheel and about which the power unit can move angularly, the exact position of such second axis depending on the physical characteristics of the plate.

The power unit of FIG. 2 is supported by a second mounting means in the same manner as is the power unit of FIG. 1 and it is preferred that the second mounting means for this application provides a degree of constraint against movement of the power unit in directions parallel to the first axis, i.e. laterally of the vehicles. This is because some angular displacement of the second axis may otherwise tend to occur due to twisting of the plate 33.

A further modified form of first mounting means which is not illustrated is somewhat similar to that shown in FIG. 2, with the exception that a vertically orientated spring plate or assembly of laminated plates is secured along both its upper and lower edges to either the frame or the power unit. The other member, i.e. the power unit or the frame, would be secured to the plate along a line parallel to and between the secured edges. A first mounting means of this type may also be manufactured from a fabric reinforced rubber or other elastomeric material capable of providing the required displacements and control of alignment.

In yet another modification, the rear of the power unit may be mounted on a slider which is movable in a fore and aft direction relative to the frame. Again, a part connected rigidly to the frame may co-operate with a part slidably secured to the power unit.

In the illustrated constructions, the power unit is provided with a single second mounting means at the top of its cylinder block. However, a plurality of such mountings may be utilised. Althogh it is a convenient construction for the second mounting means to incorporate rubber or like elastomeric elements thereby providing damping for the movement of the power unit, resilient damping means may be incorporating in or attached to the first mounting at the rear of the power unit, or may be provided independently of or supplementary to the other mountings of the power unit.

The mounting means above described can provide effective vibration isolation for engines of widely varying type. For example, single, twin or multi-cylinder engines of two or four stroke type can be thus mounted, as long as the out-of-balance forces produced thereby are such as to produce components acting radially and tangentially to an axis at or adjacent the rear of the power unit.

I claim:

1. A loop driven vehicle comprising a frame, a power unit which produces out of balance forces when in operation, mounting means movably mounting the power unit on the frame, a fork pivotally mounted on the power unit and a rear wheel mounted in the fork for rotation about a first axis, and a driving loop interconnecting the rear wheel and power unit, the mounting means comprising:
   i. first mounting means at the rear of the power unit for permitting angular movement of the power unit in response to said out of balance forces about a second axis parallel to the first axis and for permitting translatory movement of the power unit relative to the frame, such permitted movement having a horizontal component in a plane perpendicular to said first axis at least a number of times greater than vertical and lateral components of such movement, said first mounting means comprising:
      a. a generally U-shaped support member with a base portion and two parallel limbs;
      b. means for pivotally mounting the limbs to the power unit to define said second axis; and
      c. means for pivotally mounting the support member to the frame to define a pivotal axis which is fixed relative to the frame and is parallel to and substantially in vertical alignment with said second axis, and
   ii. resilient second mounting means for accommodating movement of a further part of the power unit resulting from said movement of the power unit permitted by the first mounting means.

2. A loop driven vehicle according to claim 1 wherein
   i. a lug is provided at the rear of the power unit;
   ii. a shaft extends through said lug and said limbs adjacent the free ends thereof to constitute said means pivotally mounting the support member to the power unit; and
   iii. a further shaft extends through the base portion of the support member and through a frame portion of the vehicle to constitute said means for pivotally mounting the support member to the frame.

3. A loop driven vehicle according to claim 2 wherein said first shaft also constitutes a pivotal mounting for the fork in which the rear wheel of the vehicle is mounted.

4. A loop driven vehicle comprising a frame, a power unit, which produces out of balance forces when in operation, mounting means movably mounting the power unit on the frame, a fork pivotally mounted on the power unit and a rear wheel mounted in the fork for rotation about a first axis, and a driving loop interconnecting the rear wheel and power unit, the mounting means comprising:

i. first mounting means at the rear of the power unit for permitting angular movement of the power unit in response to said out of balance forces about a second axis parallel to the first axis and for permitting translatory movement of the power unit relative to the frame, such permitted movement having a horizontal component in a plane perpendicular to said first axis at least a number of times greater than vertical and lateral components of such movement, said first mounting means comprising:
   a. a resilient plate member having first and second opposite parallel edge regions;
   b. means rigidly securing the first edge region of the plate member to the power unit, along a region parallel to said first axis; and
   c. means rigidly securing the second edge region of the plate member to the frame along a region parallel to and substantially in vertical alignment with said first region; and
ii. resilient second mounting means for accommodating movement of a further part of the power unit resulting from said movement of the power unit permitted by the first mounting means.

* * * * *